US012807136B2

(12) United States Patent
Musha et al.

(10) Patent No.: US 12,807,136 B2
(45) Date of Patent: Nov. 24, 2026

(54) PARKING ASSISTANCE METHOD AND PARKING ASSISTANCE DEVICE

(71) Applicant: Nissan Motor Co., Ltd., Yokohama (JP)

(72) Inventors: Yusuke Musha, Kanagawa (JP); Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 19/148,952

(22) PCT Filed: Jan. 27, 2023

(86) PCT No.: PCT/JP2023/002586
§ 371 (c)(1),
(2) Date: Jul. 17, 2025

(87) PCT Pub. No.: WO2024/157441
PCT Pub. Date: Aug. 2, 2024

(65) Prior Publication Data
US 2026/0217240 A1 Jul. 30, 2026

(51) Int. Cl.
*B60W 30/06* (2006.01)
*B60K 35/81* (2024.01)

(52) U.S. Cl.
CPC ............ *B60W 30/06* (2013.01); *B60K 35/81* (2024.01); *B60W 2554/20* (2020.02)

(58) Field of Classification Search
CPC .... B60W 30/06; B60W 2554/20; B60K 35/81
USPC ........................................ 340/932.2
See application file for complete search history.

(56) References Cited

U.S. PATENT DOCUMENTS

| | | | | |
|---|---|---|---|---|
| 10,930,150 | B2 * | 2/2021 | Matsunaga | H04L 12/40182 |
| 11,458,961 | B2 * | 10/2022 | Hiei | B62D 15/0285 |
| 11,651,596 | B2 * | 5/2023 | Hiei | B60W 30/06 701/117 |
| 11,718,343 | B2 * | 8/2023 | Hiei | B60W 30/06 340/932.2 |
| 2015/0219760 | A1 * | 8/2015 | Hiramaki | B62D 15/0285 367/99 |
| 2016/0110619 | A1 * | 4/2016 | Kim | B60R 1/27 382/104 |
| 2016/0214531 | A1 * | 7/2016 | Bachorski | B60Q 9/00 |
| 2017/0076608 | A1 * | 3/2017 | Suzuki | G08G 1/168 |
| 2018/0111609 | A1 * | 4/2018 | Woo | B60W 30/06 |
| 2020/0070814 | A1 * | 3/2020 | Park | B60W 40/105 |
| 2020/0242936 | A1 * | 7/2020 | Matsunaga | H04L 12/40182 |
| 2020/0398824 | A1 * | 12/2020 | Tsujino | B60W 60/0025 |

(Continued)

FOREIGN PATENT DOCUMENTS

JP 2021-095113 A 6/2021

*Primary Examiner* — Zhen Y Wu
(74) *Attorney, Agent, or Firm* — Young Basile Hanlon & MacFarlane, P.C.

(57) ABSTRACT

A parking assistance method, when a restriction factor is present at a time of registering learned target object data in a storage device, does not register the learned target object data in the storage device and also displays, when an environmental factor dependent on an environment of an own vehicle is present as the restriction factor, the environmental factor on a display device and, when a user factor dependent on a user is present as the restriction factor, the user factor on the display device.

8 Claims, 5 Drawing Sheets

(56) References Cited

U.S. PATENT DOCUMENTS

| | | | | |
|---|---|---|---|---|
| 2021/0107458 | A1* | 4/2021 | Hiei | B62D 15/0285 |
| 2021/0107465 | A1* | 4/2021 | Hiei | B60W 30/06 |
| 2021/0107467 | A1* | 4/2021 | Hiei | B60W 30/06 |
| 2021/0107524 | A1* | 4/2021 | Hiei | B60W 30/06 |
| 2021/0107562 | A1* | 4/2021 | Horiguchi | B60W 40/09 |
| 2021/0402985 | A1* | 12/2021 | Matsuda | B60T 7/22 |
| 2022/0204039 | A1* | 6/2022 | Kang | B60W 60/0016 |
| 2022/0237927 | A1* | 7/2022 | Hiei | G06V 10/60 |
| 2022/0327931 | A1* | 10/2022 | Tsubakimoto | G08G 1/005 |
| 2022/0379880 | A1* | 12/2022 | Hiei | B60W 30/06 |
| 2022/0383746 | A1* | 12/2022 | Takagi | B62D 15/0285 |
| 2024/0054793 | A1* | 2/2024 | Imai | G06V 20/586 |

* cited by examiner

FIG. 1
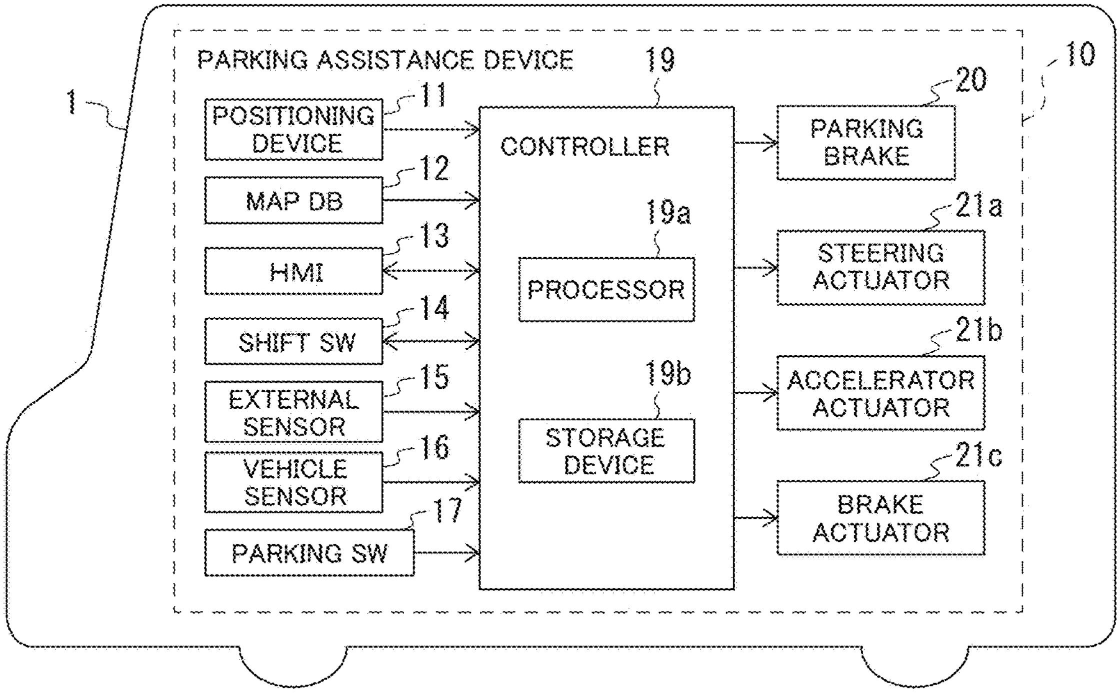
FIG. 2A
FIG. 2B
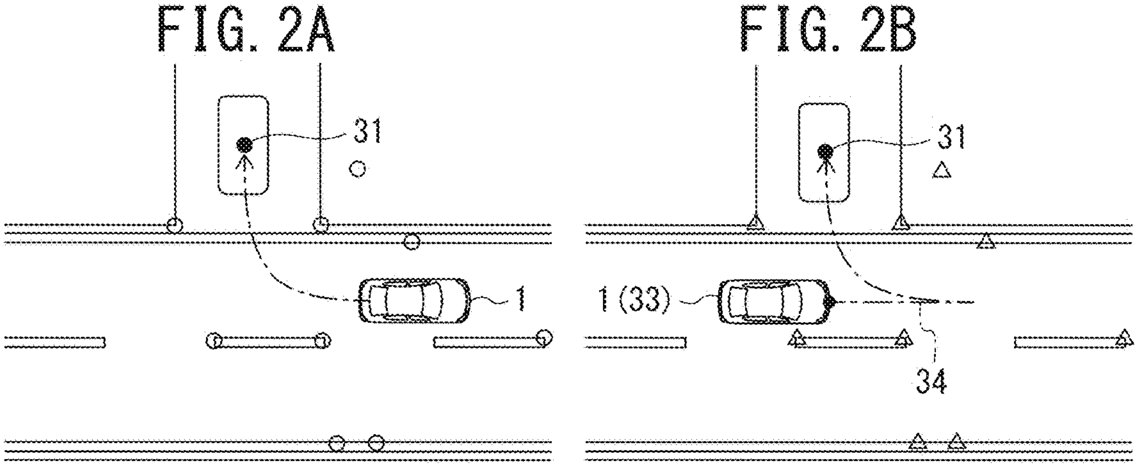
FIG. 3
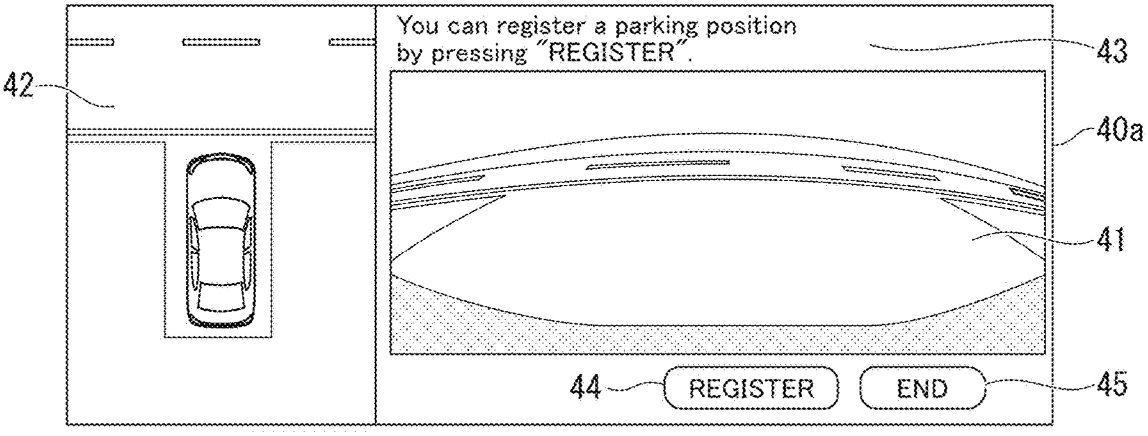

PARKING ASSISTANCE METHOD AND PARKING ASSISTANCE DEVICE

TECHNICAL FIELD

The present invention relates to a parking assistance method and a parking assistance device.

BACKGROUND

In JP 2021-095113 A described below, outputting an alarm when during autonomous parking of a vehicle using a parking assistance system, the vehicle is determined to be in a state prohibiting the parking operation is described.

SUMMARY

When in parking assistance control in which a target parking position is registered in an own vehicle in advance and parking of the own vehicle at the registered target parking position is assisted, a situation in which the target parking position cannot be registered occurs, there has been a risk that since a user cannot determine a cause of the situation, the user cannot cope with the situation in which the target parking position cannot be registered.

An object of the present invention is to facilitate, when a target parking position cannot be registered in an own vehicle, a user to cope with a situation in which the target parking position cannot be registered.

A parking assistance method for assisting parking of an own vehicle at a target parking position is provided. The parking assistance method includes: detecting a target object existing in surroundings of the target parking position in advance and registering data representing a relative positional relationship between the detected target object and the target parking position in a storage device as learned target object data; detecting, at a time of causing the own vehicle to move to the target parking position after registering the learned target object data in the storage device, a position of a surrounding target object, the surrounding target object being a target object existing in surroundings of the own vehicle; calculating a relative positional relationship between the target parking position and a current position of the own vehicle, based on the learned target object data and a position of the surrounding target object; calculating a travel trajectory starting from a current position of the own vehicle and reaching the target parking position, based on the calculated relative positional relationship; and assisting parking of the own vehicle at the target parking position, based on the travel trajectory. The parking assistance method, when a restriction factor is present at a time of registering the learned target object data in a storage device, does not register the learned target object data in the storage device and also displays, when an environmental factor dependent on an environment of the own vehicle is present as the restriction factor, the environmental factor on a display device and, when a user factor dependent on a user is present as the restriction factor, the user factor on the display device.

The present invention facilitates, when a target parking position at which an own vehicle is to be parked cannot be registered, a user to cope with a situation in which the target parking position cannot be registered.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 1 is a diagram illustrative of a schematic configuration example of a parking assistance device of embodiments;

FIGS. 2A and 2B are schematic diagrams descriptive of parking assistance control;

FIG. 3 is a schematic diagram of an example of a registration guidance screen;

DETAILED DESCRIPTION

First Embodiment (Configuration)

Figure 4:
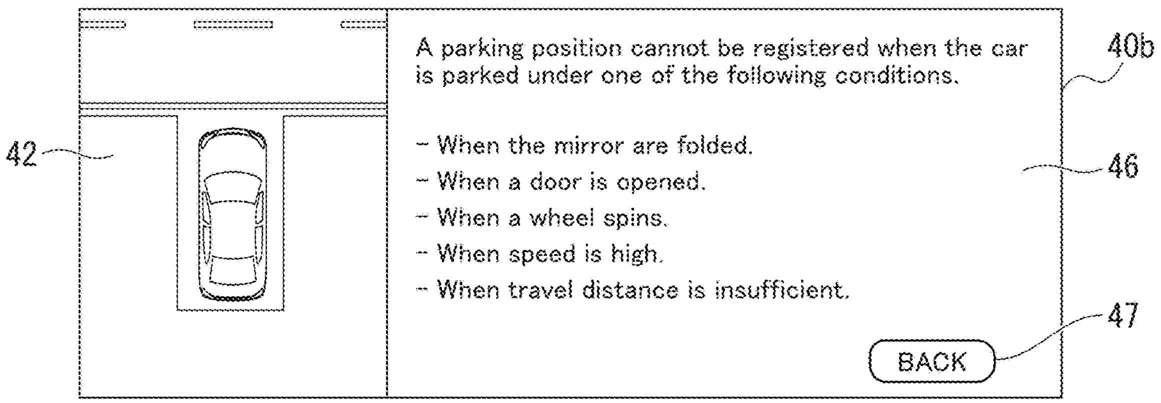
FIG. 4 is a schematic diagram of an example of a first help screen.

FIG. 1 is a diagram illustrative of a schematic configuration example of a parking assistance device of embodiments. An own vehicle 1 includes a parking assistance device 10 configured to assist parking of the own vehicle 1 at a target parking position. The parking assistance device 10 assists the own vehicle 1 in traveling along a target parking route from a current position of the own vehicle 1 to the target parking position. For example, the driving assistance device 10 may perform autonomous driving to control the own vehicle 1 to travel to the target parking position along the target parking route of the own vehicle 1. The autonomous driving to control the own vehicle 1 to travel to the target parking position along the target parking route means control to automatically perform all or a portion of travel along the target parking route of the own vehicle 1 by controlling all or some of a steering angle, driving force, and braking force of the own vehicle 1. Alternatively, the parking assistance device 10 may assist a user on board the own vehicle 1 (for example, a passenger such as a driver) in parking the own vehicle 1 by displaying the target parking route and the current position of the own vehicle 1 on a display device that the user can visually recognize.

A positioning device 11 measures the current position of the own vehicle 1. The positioning device 11 includes, for example, a global navigation satellite system (GNSS) receiver. In a map database (map DB) 12, map data are stored. The map data stored in the map database 12 may be, for example, map data for navigation or high-definition map data that is suitable as a map for autonomous driving.

Human-machine interfaces (HMIs) 13 are interface devices that transfer information between the parking assistance device 10 and the user. For example, the HMIs 13 may include a display device that the user can visually recognize, as an interface presenting visual information to the user. In addition, the HMIs 13 may include a speaker or a buzzer as an interface presenting auditory information to the user. In addition, the HMIs 13 may include an interface (such as a touch panel, a button, a switch, a lever, a dial, and a keyboard) accepting an operation input from the user.

A shift switch (shift SW) 14 is a switch for the driver or the parking assistance device 10 to switch a shift position of the own vehicle 1.

External sensors 15 detect an object existing in a predetermined distance range from the own vehicle 1. The external sensors 15 detect a surrounding environment of the own vehicle 1, such as a relative position between an object existing in surroundings of the own vehicle 1 and the own vehicle 1, distance between the own vehicle 1 and the object, and a direction in which the object exists. The external sensors 15 may include, for example, a camera to capture an image depicting the surrounding environment of the own vehicle 1. The external sensors 15 may include a ranging device, such as a laser range finder, a radar, a light detection and ranging (LiDAR), and a sonar. Vehicle sensors 16 detect various information (vehicle information) about the own vehicle 1. For example, the vehicle sensors 16 may include a vehicle speed sensor to detect traveling speed of the own vehicle 1, a triaxial acceleration sensor to detect acceleration (including deceleration) in three axial directions of the own vehicle 1, and a sensor to detect a steering angle of a steering wheel or a steered angle of steered wheels.

A parking switch (parking SW) 17 is a switch to start parking assistance control performed by the parking assistance device 10.

A controller 19 is an electronic control unit that performs parking assistance control of the own vehicle 1. The controller 19 includes a processor 19*a* and a peripheral component, such as a storage device 19*b*. The processor 19*a* may be, for example, a CPU or an MPU. The storage device 19*b* may include a semiconductor storage device, a magnetic storage device, an optical storage device, or the like. Functions of the controller 19, which will be described below, are achieved by, for example, the processor 19*a* executing computer programs stored in the storage device 19*b*.

A parking brake 20 generates friction braking force on wheels of the own vehicle 1 in accordance with operation by the user or a control signal from the controller 19.

A steering actuator 21*a* controls steering direction and the amount of steering of a steering mechanism of the own vehicle 1 in accordance with a control signal from the controller 19. An accelerator actuator 21*b* controls accelerator opening of a drive device, which is an engine or a drive motor, in accordance with a control signal from the controller 19. A brake actuator 21*c* causes a braking device to operate in accordance with a control signal from the controller 19.

Next, the parking assistance control performed by the controller 19 will be described. FIGS. 2A and 2B are schematic diagrams descriptive of the parking assistance control. When the parking assistance control is used, a target parking position 31 at which the own vehicle 1 is to be parked is registered in the parking assistance device 10 in advance. Specifically, a target object existing in surroundings of the target parking position 31 is extracted and stored (registered) in the storage device 19*b* in advance. In the following description, a target object in the surroundings of the target parking position 31 to be stored in the storage device 19*b* is referred to as "learned target object". In FIG. 2A, circular marks schematically represent learned target objects. When the target parking position 31 is to be registered in the parking assistance device 10, the user performs an operation to instruct registration of the target parking position 31 (hereinafter, sometimes referred to as "registration operation"). For example, the registration operation may be to manipulate (press) a parking switch 17 when the shift position is in a parking range. The controller 19 may automatically start the registration processing of the target parking position 31 when the shift position changes to the parking range. The parking assistance device 10 may be able to be set to an automatic start mode in which the controller 19 automatically starts the registration processing of the target parking position 31 when the shift position changes to the parking range or a manual start mode in which the controller 19 starts the registration processing of the target parking position 31 when the parking switch 17 is operated while the shift position is in the parking range, by switching therebetween.

For example, the controller 19 detects a target object in the surroundings of the own vehicle 1 by the external sensors 15 and stores the detected target object as a learned target object when the user parks the own vehicle 1 at the target parking position 31 by manual driving. For example, the controller 19 may detect a target object from a surrounding image that is obtained by capturing the surroundings of the own vehicle 1 by the camera. For example, the controller 19 may detect, as a target object, an edge point where luminance changes between adjacent pixels by a predetermined amount or more or a point having a characteristic shape (a feature point), such as an edge or a corner of a target object like a pavement marking, a road boundary, an obstacle, or the like, in the captured image obtained by capturing the surroundings by the camera.

The controller 19 stores learned target object data relating to a learned target object in the storage device 19*b*. For example, the learned target object data may include data representing a feature amount of a learned target object (hereinafter, referred to as "feature amount data") and data representing a relative positional relationship between the target parking position 31 and the learned target object (hereinafter, referred to as "relative position data").

As the relative position data, a relative position of a learned target object with reference to the target parking position 31 may be stored. For example, the controller 19 can acquire a position of a learned target object detected when the own vehicle 1 is parked at the target parking position 31 as a relative position of the learned target object with reference to the target parking position 31. The controller 19 may store coordinates of a learned target object and the target parking position 31 in a coordinate system with a fixed point as a reference point (hereinafter, referred to as "map coordinate system").

FIG. 2B is an explanatory diagram of an example of processing performed when parking assistance is performed. The controller 19 starts the parking assistance control of the own vehicle 1 when a user operation instructing start of the parking assistance control of the own vehicle 1 is performed (hereinafter, sometimes referred to as "starting operation"). For example, the starting operation may be an operation of the parking switch 17 by the user. In addition, the controller 19 may automatically start the parking assistance control when the own vehicle 1 approaches the registered target parking position 31.

When the parking assistance control is started, the controller 19 extracts a target object in the surroundings of the own vehicle 1 by the external sensors 15. In the following description, a target object in the surroundings of the own vehicle 1 that is extracted when the parking assistance is performed is referred to as "surrounding target object". In FIG. 2B, triangular marks represent surrounding target objects. The controller 19 detects the target parking position 31 by matching a learned target object and a surrounding target object with each other and associating the same feature points with each other. The controller 19 calculates a relative position of the own vehicle 1 with respect to the target parking position 31, based on a relative positional relationship between a surrounding target object detected when the parking assistance is performed and the own vehicle 1 and a relative positional relationship between a learned target object associated with the surrounding target object and the target parking position 31.

For example, the controller 19 calculates a position of the target parking position 31 in a coordinate system with reference to the current position of the own vehicle 1 (hereinafter, referred to as "vehicle coordinate system"). Note that when coordinates of the learned target object and the target parking position 31 in the map coordinate system are stored in the storage device 19*b*, the controller 19 may convert the coordinates of the target parking position 31 in the map coordinate system to coordinates in the vehicle coordinate system, based on the position of the surrounding target object detected when the parking assistance is performed and the position of the learned target object in the map coordinate system. The controller 19 may calculate the self-position of the own vehicle 1 in the map coordinate system, based on the position of the surrounding target object detected when the parking assistance is performed and the position of the learned target object in the map coordinate system, and calculate the relative position of the own vehicle 1 with respect to the target parking position 31 from a difference between the coordinates of the own vehicle 1 and the coordinates of the target parking position 31 in the map coordinate system.

The controller 19 calculates a target parking route 34 starting from a current position 33 of the own vehicle 1 and reaching the target parking position 31, based on the relative position of the own vehicle 1 with respect to the target parking position 31. The controller 19 performs the parking assistance control of the own vehicle 1, based on the calculated target parking route 34.

On the occasion when the learned target object data of the target parking position 31, at which the own vehicle 1 is to be parked, are registered in the storage device 19*b*, the controller 19 determines whether or not a restriction factor that prevents the registration of the learned target object data in the storage device 19*b* is present. When no restriction factor is present, the controller 19 displays a registration guidance screen that prompts the user to register the target parking position 31, on the display device in the HMIs 13. FIG. 3 is a schematic diagram of an example of the registration guidance screen. For example, a registration guidance screen 40*a* includes a captured image 41 generated by capturing the surroundings of the own vehicle 1, an overhead view image 42 generated by converting captured images of the surroundings of the own vehicle 1, a message display area 43 in which a notification such as a visual message is displayed, a registration button 44, and an end button 45.

In the message display area 43 of the registration guidance screen 40*a*, for example, a notification, such as a visual message, that notifies the user that the user can register a target parking position may be displayed. When the user operates the registration button 44 or the end button 45 displayed on the display device, a touch panel provided on the display device detects such an operation.

Figure 8:
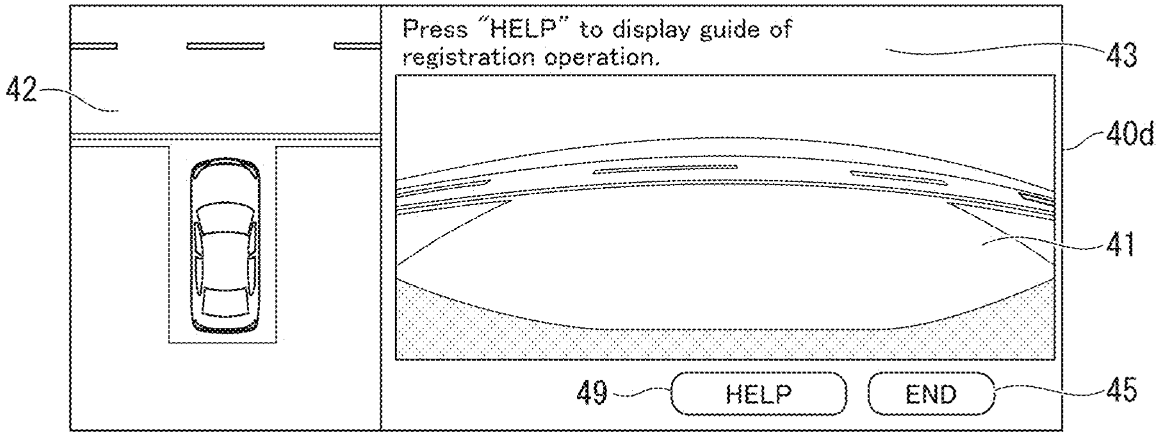
FIG. 8 is a schematic diagram of an example of a registration possibility determination screen.

When the registration button 44 is operated, the controller 19 registers learned target object data relating to a learned target object detected in the surroundings of the target parking position 31 in the storage device 19*b*. When the end button 45 is operated, the controller 19 suspends the registration processing of the target parking position 31. The same applies to a case where an end button 45 in a registration possibility determination screen 40*d*, which will be described later, illustrated in FIG. 8 is operated.

In contrast, when a restriction factor preventing the registration of the learned target object data in the storage device 19*b* is present, the controller 19 determines whether a restriction cause is a user factor dependent on the user or an environmental factor dependent on the environment of the own vehicle 1.

When the restriction cause is a user factor, the controller 19 displays a first help screen that informs the user of the user factor on the display device in the HMIs 13. FIG. 4 is a schematic diagram of an example of the first help screen. For example, a first help screen 40*b* includes an overhead view image 42, a user factor display area 46 in which a user factor is displayed, and a back button 47. When the user operates the back button 47, the touch panel provided on the display device detects the operation and the controller 19 terminates the display of the first help screen 40*b*.

Figure 5:
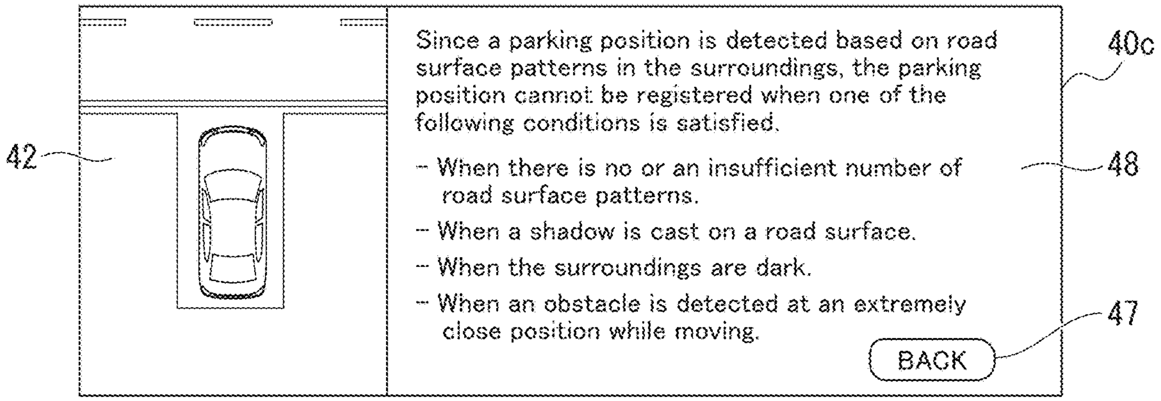
FIG. 5 is a schematic diagram of an example of a second help screen.

When the restriction cause is an environmental factor, the controller 19 displays a second help screen that informs the user of the environmental factor on the display device in the HMIs 13. FIG. 5 is a schematic diagram of an example of the second help screen. For example, a second help screen 40*c* includes an overhead view image 42, an environmental factor display area 48 in which an environmental factor is displayed, and a back button 47. When the user operates the back button 47, the controller 19 terminates the display of the second help screen 40*c*.

(Operation)

Figure 6:
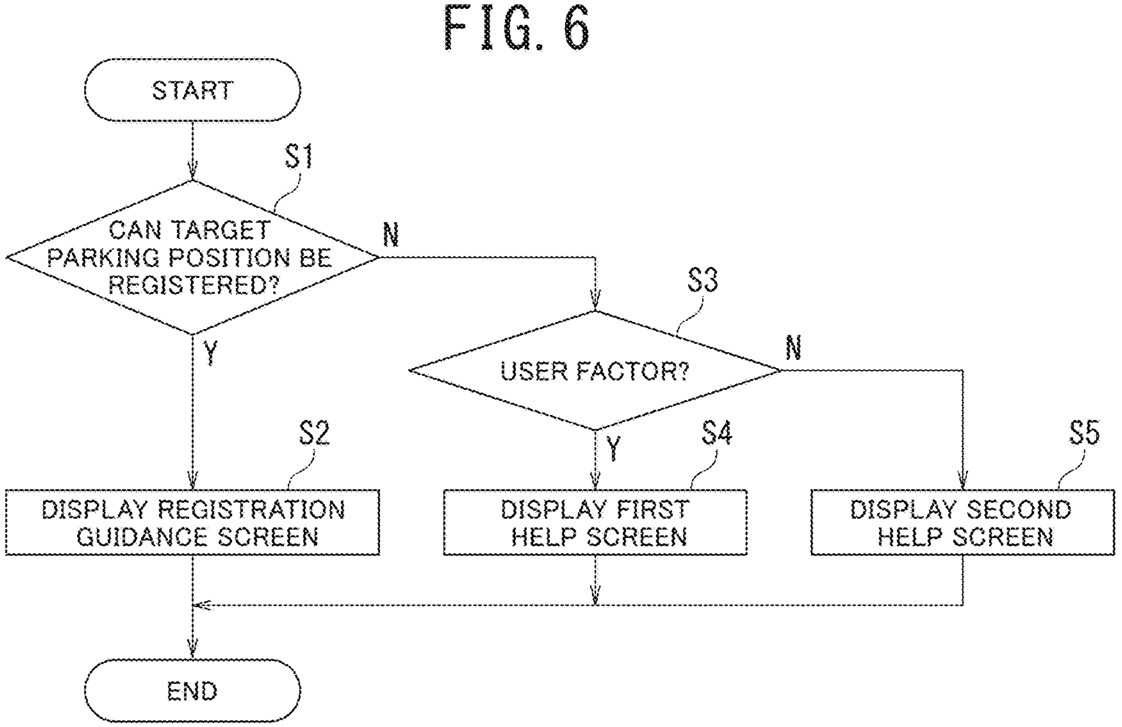
FIG. 6 is a flowchart of a driving assistance method of a first embodiment.

FIG. 6 is a flowchart of a driving assistance method of a first embodiment.

In step S1, the controller 19 determines whether or not the target parking position 31 can be registered (that is, determines whether or not a restriction cause preventing the registration of the target parking position 31 is present). When the target parking position 31 can be registered (step S1: Y), the process proceeds to step S2. When the target parking position 31 cannot be registered (step S1: N), the process proceeds to step S3. In step S2, the controller 19 displays the registration guidance screen 40*a* on the display device. In step S3, the controller 19 determines whether or not the restriction factor preventing the registration of the target parking position 31 is a user factor. When the restriction factor is a user factor (step S3: Y), the process proceeds to step S4. When the restriction factor is an environmental factor (step S3: N), the process proceeds to step S5. In step S4, the controller 19 displays the first help screen 40*b* on the display device. In step S5, the controller 19 displays the second help screen 40*c* on the display device.

Second Embodiment

Figure 7:
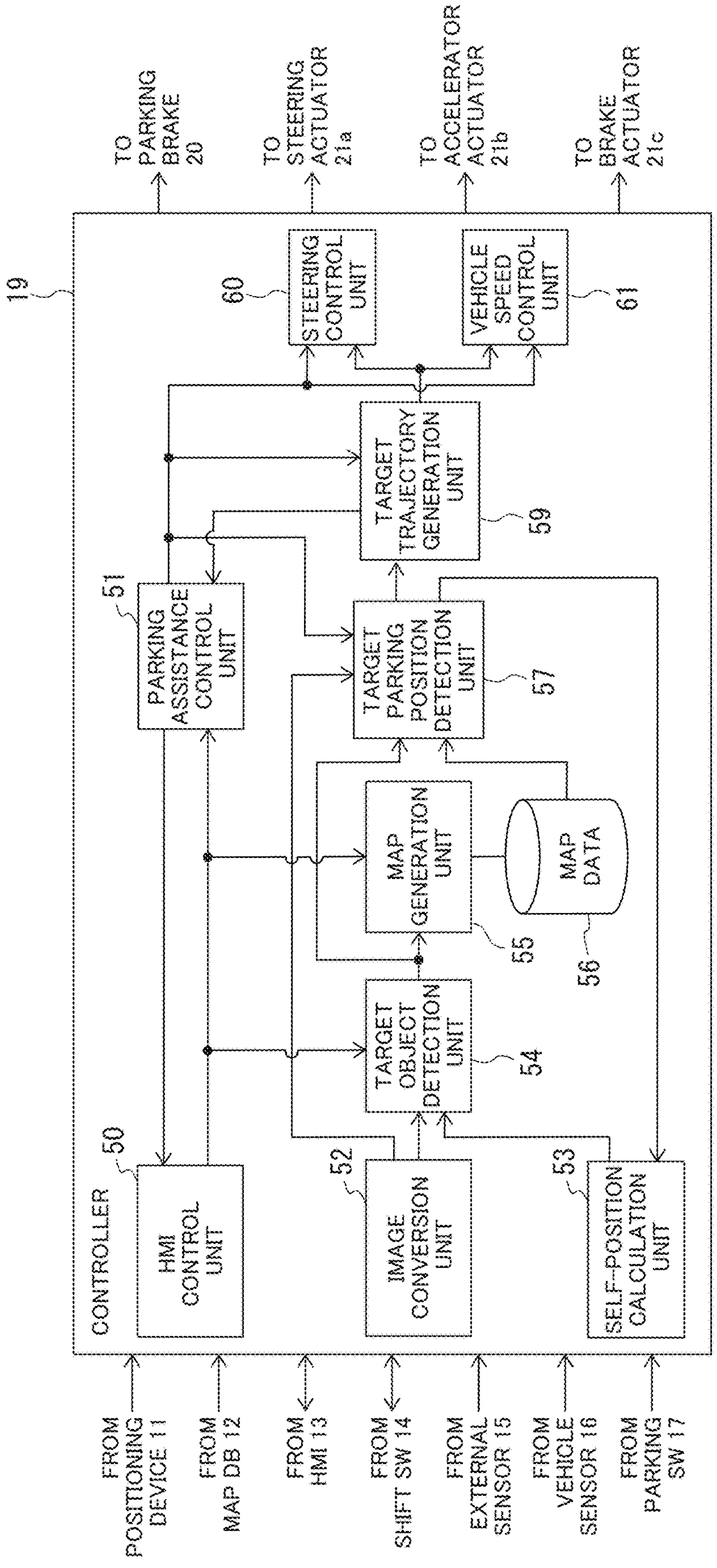
FIG. 7 is a block diagram of an example of a functional configuration of a controller in FIG. 1.

FIG. 7 is a block diagram of an example of a functional configuration of a controller 19. In a case where a parking assistance device 10 is set to a manual start mode, when an HMI control unit 50 detects that a parking switch 17 is operated while a shift position is in a parking range, the HMI control unit 50 outputs a map generation command causing learned target object data to be stored in a storage device 19*b* to a map generation unit 55. In addition, in a case where the parking assistance device 10 is set to an automatic start mode, when the HMI control unit 50 detects that the shift position has changed to the parking range, the HMI control unit 50 outputs the map generation command to the map generation unit 55.

An image conversion unit 52 converts a captured image captured by a camera to an overhead view image that is an image viewed from a virtual viewpoint directly above an own vehicle 1. The image conversion unit 52 generates a surrounding image that is an image depicting a surrounding region of the own vehicle 1 by converting a captured image to an overhead view image at a predetermined interval and accumulating converted overhead view images along a travel route of the own vehicle 1.

A self-position calculation unit 53 calculates a current position of the own vehicle 1 in a map coordinate system as a self-position by odometry (for example, dead reckoning) based on vehicle information output from vehicle sensors 16.

A target object detection unit 54 detects a target object from a surrounding image output from the image conversion unit 52. The target object detection unit 54 may detect a position of a feature point of a target object and an image feature amount of the feature point as a target object. The target object detection unit 54 outputs the detected position and image feature amount of the feature point to the map generation unit 55 and a target parking position detection unit 57 as target object data. In addition, the target object detection unit 54 outputs the self-position acquired from the self-position calculation unit 53 in synchronization with the detection of the target object to the map generation unit 55 and the target parking position detection unit 57.

When the map generation unit 55 receives a map generation command from the HMI control unit 50 (that is, when registration processing of a target parking position 31 is started), the map generation unit 55 performs registration possibility determination processing relating to learned target object data. In the registration possibility determination processing, the map generation unit 55 determines whether or not to register the learned target object data in the storage device 19*b* (that is, whether or not a restriction factor that prevents the registration of the learned target object data in the storage device 19*b* is present).

For example, the map generation unit 55 determines whether or not a user factor is present as a restriction factor. The user factor may be, for example, a factor requiring that when the own vehicle 1 is parked at the target parking position 31 in order to register the learned target object data in the storage device 19*b*, at least one of the following conditions (A) to (E) is satisfied:

(A) a side mirror is folded;
(B) a door is opened;
(C) spinning of a wheel is detected;
(D) vehicle speed of the own vehicle 1 is greater than or equal to a threshold value (for example, 30 km/h); and
(E) travel distance is insufficient.

In addition, for example, the map generation unit 55 determines whether or not an environmental factor is present as a restriction factor. The environmental factor may, for example, include at least one of, at the time of capturing a captured image from which a learned target object is extracted, the number of feature points present in the surroundings of the target parking position 31 being less than a predetermined number, an illumination condition in the surroundings of the target parking position 31 being less than a predetermined condition, and clearance in the surroundings of the target parking position 31 being less than a predetermined distance.

The illumination condition in the surroundings may be a condition requiring that illuminance in the surroundings is less than or equal to a predetermined number. In addition, the clearance may be, for example, distance between a vehicle end of the own vehicle 1 and an obstacle or distance between an end of a parking space and an obstacle at the time of registering the target parking position 31.

While the map generation unit 55 is performing the registration possibility determination processing, the HMI control unit 50 displays a registration possibility determination screen that informs the user that the target parking position 31 is in the process of registration, on the display device in the HMIs 13. FIG. 8 is a schematic diagram of an example of the registration possibility determination screen. For example, a registration possibility determination screen 40*d* includes a captured image 41, an overhead view image 42, a message display area 43, a help button 49, and an end button 45.

For example, in the message display area 43, a notification, such as a visual message, that prompts the user to press the help button 49 to confirm information relating to the registration of the target parking position 31 (for example, precautions for the registration of the target parking position 31) may be displayed.

When the user operates the help button 49, the HMI control unit 50 detects the operation of the help button 49 via a touch panel provided on the display device.

When the help button 49 is operated before the registration possibility determination processing is completed, the HMI control unit 50 displays a first help screen 40*b* illustrated in FIG. 4 on the display device in the HMIs 13. The HMI control unit 50 may display visual messages: "When the mirrors are folded."; "When a door is opened."; "When a wheel spins."; "When speed is high."; and "When travel distance is insufficient." that inform the user of the above-described user factors (A) to (E), respectively, in a user factor display area 46 of the first help screen 40*b*.

Meanwhile, when the registration possibility determination processing is completed and the map generation unit 55 determines to register learned target object data in the storage device 19*b*, the HMI control unit 50 displays a registration guidance screen 40*a* illustrated in FIG. 3 on the display device in the HMIs 13. When a registration button 44 is operated, the map generation unit 55 stores the learned target object data in the storage device 19*b* as map data 56.

Note that the generation of learned target object data may be performed in parallel with the registration possibility determination processing or the generation of learned target object data may be started after determining to register the learned target object data in the storage device 19*b*.

For example, the map generation unit 55 receives target object data and a self-position of the own vehicle 1 in the map coordinate system that is synchronous with the target object data from the target object detection unit 54. The map generation unit 55 acquires position information of the target parking position 31 in the map coordinate system. For example, the map generation unit 55 may acquire a self-position that the self-position calculation unit 53 calculates when the own vehicle 1 is positioned at the target parking position 31 as the position information of the target parking position 31.

The map generation unit 55 generates relative position data, based on a position of a feature point included in the target object data, position information of the own vehicle 1 synchronous with the position of the feature point, and position information of the target parking position 31. The map generation unit 55 acquires feature amount data from the target object data output from the target object detection unit 54. The map generation unit 55 generates learned target object data including the above-described relative position data and feature amount data.

In addition, when the registration possibility determination processing is completed and the map generation unit 55 determines not to register learned target object data in the storage device 19*b* (that is, when a restriction factor is present), the HMI control unit 50 continues display of the registration possibility determination screen 40*d*, illustrated in FIG. 8. When the help button 49 is operated, the HMI control unit 50 determines whether the restriction factor is a user factor or an environmental factor. When the restriction factor is a user factor, the HMI control unit 50 displays the first help screen 40*b*, illustrated in FIG. 4, on the display device in the HMIs 13. When the restriction factor is an environmental factor, the HMI control unit 50 displays a second help screen 40*c* illustrated in FIG. 5 on the display device in the HMIs 13.

The HMI control unit 50 may display visual messages: "When there is no or an insufficient number of road surface patterns."; "When a shadow is cast on a road surface or the surroundings are dark."; and "When an obstacle is detected at an extremely close position while moving." that inform the user of the above-described environmental factors (the quantity of feature points in the surroundings of the target parking position 31 is insufficient, the illumination condition in the surroundings of the target parking position 31 is inappropriate, and the clearance in the surroundings of the target parking position 31 is insufficient), respectively, in an environmental factor display area 48 of the second help screen 40*c*.

Note that when a user factor and an environmental factor are simultaneously present, the HMI control unit 50 may preferentially display one of the user factor and the environmental factor. For example, when the help button 49 is operated, the HMI control unit 50 may preferentially display one of the first help screen 40*b* and the second help screen 40*c*.

While a user factor is a factor that is comparatively easy for a user to eliminate, eliminating an environmental factor involves difficulty in many cases. Thus, when a user factor and an environmental factor are simultaneously present, the HMI control unit 50 may, for example, display the environmental factor preferentially over the user factor.

On the contrary, the HMI control unit 50 may display the user factor preferentially over the environmental factor. When a user factor and an environmental factor are simultaneously present, the HMI control unit 50 may display both the user factor and the environmental factor.

When the user operates the back button 47 in the first help screen 40*b* or the second help screen 40*c*, the HMI control unit 50 determines whether or not the restriction factor has been eliminated. When the restriction factor has been eliminated, the HMI control unit 50 may display the registration guidance screen 40*a* on the display device in the HMIs 13. When the restriction factor has not been eliminated, the HMI control unit 50 may display the registration possibility determination screen 40*d* on the display device in the HMIs 13.

In addition, when the restriction factor is eliminated, the HMI control unit 50 may automatically display the registration guidance screen 40*a* even without the user operating the back button 47.

Furthermore, even when the restriction factor has been eliminated when the user operates the back button 47, the HMI control unit 50 may display the registration guidance screen 40*a* under the condition that, after the map generation unit 55 determined not to register the learned target object data in the storage device 19*b*, operation to park the own vehicle 1 at the target parking position 31 has been performed again. When after the map generation unit 55 determined not to register the learned target object data in the storage device 19*b*, the operation to park the own vehicle 1 at the target parking position 31 has not been performed again, the HMI control unit 50 may display the registration possibility determination screen 40*d* on the display device in the HMIs 13.

For example, when the learned target object data cannot be registered in the storage device 19*b* since there is a problem with a surrounding image of the own vehicle 1 (that is, an image from which a learned target object is extracted) generated by the image conversion unit 52 due to presence of a restriction factor, the HMI control unit 50 may display the registration guidance screen 40*a* after the operation to park the own vehicle 1 at the target parking position 31 is performed again. For example, when the surrounding image is not suitable for feature point extraction, the HMI control unit 50 may display the registration guidance screen 40*a* after the operation to park the own vehicle 1 at the target parking position 31 is performed again.

For example, since when the surrounding image is captured while a side mirror is folded, a door is opened, or the vehicle speed is too high or travel distance at the time of capturing the surrounding image is not sufficient, a problem may occur in the surrounding image generated by the image conversion unit 52, the operation to park the own vehicle 1 at the target parking position 31 is required to be performed again. The same applies to a case where the quantity of feature points present in the surroundings of the target parking position 31 is insufficient or a case where the illumination condition in the surroundings of the target parking position 31 is inappropriate.

On the other hand, in a case where the map generation unit 55 determines not to register the learned target object data in the storage device 19*b* even when there is no problem with the surrounding image of the own vehicle 1 generated by the image conversion unit 52, the HMI control unit 50 may display the registration guidance screen 40*a* even when the operation to park the own vehicle 1 at the target parking position 31 is not performed again if the restriction factor is eliminated.

For example, when a side mirror is folded or a door is opened after the own vehicle 1 is parked at the target parking position 31 in order to register the learned target object data in the storage device 19*b*, the HMI control unit 50 may display the registration guidance screen 40*a* even when the operation to park the own vehicle 1 at the target parking position 31 is not performed again if such user factors are eliminated. In addition, for example, when after the map generation unit 55 determines not to register the learned target object data in the storage device 19*b*, an obstacle in the surroundings of the target parking position 31 is removed and the environmental factor that clearance in the surroundings of the target parking position 31 is insufficient is thus eliminated, the HMI control unit 50 may also display the registration guidance screen 40*a* even without the operation to park the own vehicle 1 at the target parking position 31 being performed again.

FIG. 7 is now referred to. When the HMI control unit 50 detects a starting operation of the parking assistance control performed by the user, the HMI control unit 50 outputs a control start command to start the parking assistance control to assist parking at the target parking position, to a parking assistance control unit 51.

When the parking assistance control unit 51 receives a control start command from the HMI control unit 50, the parking assistance control unit 51 determines whether or not a current position of the own vehicle 1 is in a vicinity of the registered target parking position 31. When the current position of the own vehicle 1 is in the vicinity of the registered target parking position 31, the parking assistance control unit 51 executes the parking assistance control. The parking assistance control unit 51 may automatically start the parking assistance control when the own vehicle 1 approaches the registered target parking position 31.

When the parking assistance control unit 51 starts the parking assistance control, the parking assistance control unit 51 outputs a parking position calculation command to the target parking position detection unit 57. When the target parking position detection unit 57 receives a parking position calculation command, the target parking position detection unit 57 receives target object data output from the target object detection unit 54 as target object data of a surrounding target object and also receives the self-position of the own vehicle 1 in the map coordinate system in synchronization with the reception of the target object data.

The target parking position detection unit 57 detects the target parking position 31 by matching a learned target object and a surrounding target object with each other and associating the same feature points with each other. That is, the target parking position detection unit 57 determines whether or not the target parking position 31 can be detected, based on whether or not matching between the learned target object and the surrounding target object succeeds. When the matching succeeds (that is, when the target parking position 31 is detected), the target parking position detection unit 57 calculates a relative position of the own vehicle 1 with respect to the target parking position 31, based on a relative positional relationship between a surrounding target object and the own vehicle 1 and a relative positional relationship between a learned target object associated with the surrounding target object and the target parking position 31.

A target trajectory generation unit 59 calculates a target parking route starting from the current position of the own vehicle 1 and reaching the target parking position 31 in the vehicle coordinate system. The target trajectory generation unit 59 calculates a target vehicle speed profile that is a target value of vehicle speed of the own vehicle 1 on the target parking route. A steering control unit 60 controls a steering actuator 21*a* in such away that the own vehicle 1 travels along the target parking route. A vehicle speed control unit 61 controls an accelerator actuator 21*b* and a brake actuator 21*c* in such a way that the vehicle speed of the own vehicle 1 changes in accordance with the target vehicle speed profile. When the own vehicle 1 reaches (i.e., moves to) the target parking position 31 and the parking assistance control is completed, the parking assistance control unit 51 causes a parking brake 20 to operate and switches the shift position to a parking range.

Figure 9:
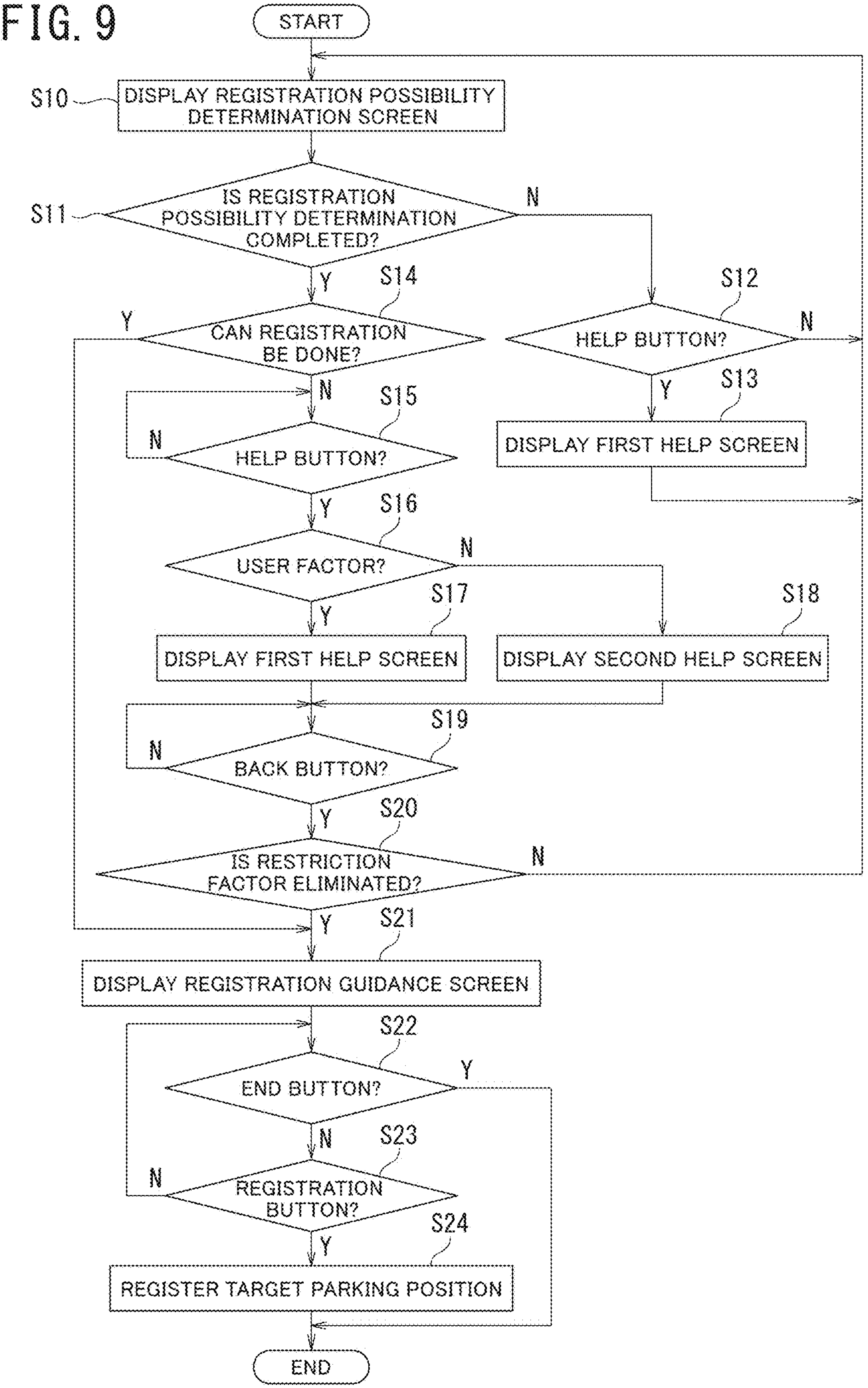
FIG. 9 is a flowchart of a driving assistance method of a second embodiment.

FIG. 9 is a flowchart of a driving assistance method of a second embodiment. When the registration processing of a target parking position 31 is started, the HMI control unit 50 displays the registration possibility determination screen 40*d* in step S10. In step S11, the HMI control unit 50 determines whether or not the registration possibility determination processing performed by the map generation unit 55 has been completed. When the registration possibility determination processing has been completed (step S11: Y), the process proceeds to step S14. When the registration possibility determination processing has not been completed (step S11: N), the process proceeds to step S12.

In step S12, the HMI control unit 50 determines whether or not the help button 49 has been operated. When the help button 49 is operated (step S12: Y), the process proceeds to step S13. When the help button 49 has not been operated (step S12: N), the process returns to step S10. In step S13, the HMI control unit 50 displays the first help screen 40*b*. Subsequently, the process returns to step S10.

When in the registration possibility determination processing, it is determined that the learned target object data can be registered (step S14: Y), the process proceeds to step S21. When the learned target object data cannot be registered (step S14: N), the process proceeds to step S15. In step S15, the HMI control unit 50 determines whether or not the help button 49 has been operated. When the help button 49 has not been operated (step S15: N), the process returns to step S15. When the help button 49 is operated (step S15: Y), the process proceeds to step S16. In step S16, the HMI control unit 50 determines whether or not a restriction factor that prevents the registering of the learned target object data is a user factor. When the restriction factor is a user factor (step S16: Y), the process proceeds to step S17. When the restriction factor is an environmental factor (step S16: N), the process proceeds to step S18. In step S17, the HMI control unit 50 displays the first help screen 40*b*. Subsequently, the process proceeds to step S19. In step S18, the HMI control unit 50 displays the second help screen 40*c*. Subsequently, the process proceeds to step S19.

In step S19, the HMI control unit 50 determines whether or not the back button 47 in the first help screen 40*b* or the second help screen 40*c* has been operated. When the back button 47 has not been operated (step S19: N), the process returns to step S19. When the back button 47 is operated (step S19: Y), the process proceeds to step S20. In step S20, the HMI control unit 50 determines whether or not the restriction factor has been eliminated. When the restriction factor has not been eliminated (step S20: N), the process returns to step S10. When the restriction factor has been eliminated (step S20: Y), the process proceeds to step S21.

In step S21, the HMI control unit 50 displays the registration guidance screen 40*a* on the display device in the HMIs 13. In step S22, the HMI control unit 50 determines whether or not the end button 45 has been operated. When the end button 45 is operated (step S22: Y), the registration processing of the target parking position 31 terminates. When the end button 45 has not been operated (step S22: N), the process proceeds to step S23. In step S23, the HMI control unit 50 determines whether or not the registration button 44 has been operated. When the registration button 44 has not been operated (step S23: N), the process returns to step S22. When the registration button 44 is operated (step S23: Y), the process proceeds to step S24. In step S24, the map generation unit 55 stores the learned target object data in the storage device 19*b*. Subsequently, the registration processing of the target parking position 31 terminates.

Advantageous Effects of Embodiments (1) A controller 19 determines, at a time of registering learned target object data in a storage device 19*b*, whether or not a restriction factor preventing registration of the learned target object data in the storage device 19*b* is present and, when a restriction factor is present, does not register the learned target object data in the storage device 19*b* and also displays, when an environmental factor dependent on an environment of the own vehicle is present as the restriction factor, the environmental factor on a display device and, when a user factor dependent on a user is present as the restriction factor, the user factor on the display device. Because of this configuration, when the learned target object data cannot be registered, the user can determine a restriction factor preventing the registration of the learned target object data, which facilitates the user to cope with a situation in which the target parking position cannot be registered.

(2) When the environmental factor and the user factor are simultaneously present, the controller 19 may display one of the environmental factor and the user factor and does not have to display the other. Because of this configuration, which one of the environmental factor and the user factor is notified preferentially over the other can be determined depending on characteristics of a factor preventing the registration of the learned target object data.

For example, the controller 19 may display the environmental factor preferentially over the user factor. Because of this configuration, the environmental factor that is difficult for the user to eliminate can be preferentially notified.

(3) The environmental factor may include at least one of a number of feature points present in surroundings of the target parking position being less than a predetermined number, an illumination condition in surroundings of the target parking position being less than a predetermined condition, and clearance in surroundings of the target parking position being less than a predetermined distance. Because of this configuration, it is possible to notify the user of what environmental factor prevents registration of the learned target object data in the storage device 19*b*.

(4) The user factor may be a factor requiring that when the own vehicle is caused to travel in a vicinity of the target parking position in order to register the learned target object data in the storage device, at least one of following conditions (A) to (D) is satisfied:

(A) a side mirror of the own vehicle 1 is folded;

(B) a door of the own vehicle 1 is opened;

(C) spinning of a wheel of the own vehicle 1 is detected; and (D) vehicle speed of the own vehicle 1 is greater than or equal to a threshold value.

Because of this configuration, it is possible to notify the user of what user factor prevents registration of the learned target object data in the storage device 19*b*.

(5) When the restriction factor is eliminated, the controller 19 may display a notification prompting a user to perform an operation to register the learned target object data in the storage device 19*b* on the display device. Because of this configuration, immediately after the restriction factor is eliminated and it becomes possible to register the learned target object data in the storage device 19*b*, the learned target object data can be registered in the storage device 19*b*.

(6) When the restriction factor is eliminated after an operation to park the own vehicle at the target parking position is performed again, the controller 19 may display a notification prompting a user to perform an operation to register the learned target object data in the storage device 19*b* on the display device. Because of this configuration, when information required for generation of learned target object data is acquired again after the restriction factor is eliminated, the learned target object data can be registered in the storage device 19*b*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Parking assistance device
11 Positioning device
12 Map database
13 Human-machine interface
14 Shift switch
15 External sensor
16 Vehicle sensor
17 Parking switch
19 Controller
19*a* Processor
19*b* Storage device
20 Parking brake
21*a* Steering actuator
21*b* Accelerator actuator
21*c* Brake actuator
50 HMI control unit
51 Parking assistance control unit
52 Image conversion unit
53 Self-position calculation unit
54 Target object detection unit
55 Map generation unit
56 Map data
57 Target parking position detection unit
59 Target trajectory generation unit
60 Steering control unit
61 Vehicle speed control unit

The invention claimed is:

1. A parking assistance method for assisting parking of an own vehicle at a target parking position, the parking assistance method comprising:

detecting a target object existing in surroundings of the target parking position in advance and registering data representing a relative positional relationship between the detected target object and the target parking position in a storage device as learned target object data;

detecting, at a time of causing the own vehicle to move to the target parking position after registering the learned target object data in the storage device, a position of a surrounding target object, the surrounding target object being a target object existing in surroundings of the own vehicle;

calculating a relative positional relationship between the target parking position and a current position of the own vehicle, based on the learned target object data and a position of the surrounding target object;

calculating a travel trajectory starting from a current position of the own vehicle and reaching the target parking position, based on the calculated relative positional relationship; and assisting parking of the own vehicle at the target parking position, based on the travel trajectory, wherein when a restriction factor is present at a time of registering the learned target object data in a storage device, the parking assistance method does not register the learned target object data in the storage device and also displays, when an environmental factor dependent on an environment of the own vehicle is present as the restriction factor, the environmental factor on a display device and, when a user factor dependent on a user is present as the restriction factor, the user factor on the display device.

2. The parking assistance method according to claim 1, wherein when the environmental factor and the user factor are simultaneously present, the parking assistance method displays one of the environmental factor and the user factor and does not display an other.

3. The parking assistance method according to claim 2, wherein the parking assistance method displays the environmental factor preferentially over the user factor.

4. The parking assistance method according to claim 1, wherein the environmental factor includes at least one of a number of feature points present in surroundings of the target parking position being less than a predetermined number, an illumination condition in surroundings of the target parking position being less than a predetermined condition, and clearance in surroundings of the target parking position being less than a predetermined distance.

5. The parking assistance method according to claim 1, wherein the user factor is a factor requiring that when the own vehicle is caused to travel in a vicinity of the target parking position in order to register the learned target object data in the storage device, at least one of following conditions (A) to (D) is satisfied:

(A) a side mirror of the own vehicle is folded;

(B) a door of the own vehicle is opened;

(C) a wheel spins of the own vehicle; and (D) vehicle speed of the own vehicle is greater than or equal to a threshold value.

6. The parking assistance method according to claim 1, wherein when the restriction factor is eliminated, the parking assistance method displays a notification prompting a user to perform an operation to register the learned target object data in the storage device on the display device.

7. The parking assistance method according to claim 1, wherein when the restriction factor is eliminated after an operation to park the own vehicle at the target parking position is performed again, the parking assistance method displays a notification prompting a user to perform an operation to register the learned target object data in the storage device on the display device.

8. A parking assistance device configured to assist parking of an own vehicle at a target parking position, the parking assistance device comprising:

a sensor configured to detect a target object in surroundings of the own vehicle;

a storage device;

a display device; and a controller configured to:

detect a target object existing in surroundings of the target parking position in advance and register data representing a relative positional relationship between the detected target object and the target parking position in the storage device as learned target object data;

detect, at a time of causing the own vehicle to move to the target parking position after registering the learned target object data in the storage device, a position of a surrounding target object, the surrounding target object being a target object existing in surroundings of the own vehicle;

calculate a relative positional relationship between the target parking position and a current position of the own vehicle, based on the learned target object data and a position of the surrounding target object;

calculate a travel trajectory starting from a current position of the own vehicle and reaching the target parking position, based on the calculated relative positional relationship; and assist parking of the own vehicle at the target parking position, based on the travel trajectory, wherein the controller when a restriction factor is present at a time of registering the learned target object data in a storage device, does not register the learned target object data in the storage device and also displays, when an environmental factor dependent on an environment of the own vehicle is present as the restriction factor, the environmental factor on a display device and, when a user factor dependent on a user is present as the restriction factor, the user factor on the display device.

* * * * *